US007480715B1

(12) United States Patent
Barker et al.

(10) Patent No.: US 7,480,715 B1
(45) Date of Patent: Jan. 20, 2009

(54) SYSTEM AND METHOD FOR PERFORMING A PREDICTIVE THREAT ASSESSMENT BASED ON RISK FACTORS

(75) Inventors: Geoffrey T. Barker, Bainbridge Island, WA (US); Bruce Alexander, Poulsbo, WA (US)

(73) Assignee: VIG Acquisitions Ltd., L.L.C., Wilmington, DE (US)

( * ) Notice: Subject to any disclaimer, the term of this patent is extended or adjusted under 35 U.S.C. 154(b) by 612 days.

(21) Appl. No.: 10/351,979

(22) Filed: Jan. 24, 2003

Related U.S. Application Data

(60) Provisional application No. 60/352,094, filed on Jan. 25, 2002.

(51) Int. Cl.
*G06F 15/173* (2006.01)
(52) U.S. Cl. ...................... 709/224; 709/223
(58) Field of Classification Search .......... 709/223–224
See application file for complete search history.

(56) References Cited

U.S. PATENT DOCUMENTS

| | | | |
|---|---|---|---|
| 3,757,039 A * | 9/1973 | Brewer | 348/159 |
| 4,216,375 A | 8/1980 | Ulch et al. | |
| 4,218,690 A | 8/1980 | Ulch et al. | |
| 4,581,634 A | 4/1986 | Williams | |
| 4,714,995 A | 12/1987 | Materna et al. | |
| 4,721,954 A | 1/1988 | Mauch | |
| 4,816,658 A | 3/1989 | Khandwala et al. | |
| 4,837,568 A | 6/1989 | Snaper | |
| 4,839,640 A | 6/1989 | Ozer et al. | |
| 4,962,473 A | 10/1990 | Crain | |
| 4,998,279 A | 3/1991 | Weiss | |
| 5,086,385 A | 2/1992 | Launey et al. | |
| 5,097,505 A | 3/1992 | Weiss | |
| 5,204,670 A | 4/1993 | Stinton | |
| 5,210,873 A | 5/1993 | Gay et al. | |
| 5,367,624 A | 11/1994 | Cooper | |
| 5,465,358 A * | 11/1995 | Blades et al. | 715/707 |

(Continued)

FOREIGN PATENT DOCUMENTS

EP 0804031 A 10/1997

(Continued)

OTHER PUBLICATIONS

EyeCast.com Introduces SchoolCast services for School Safety Officials and Law Enforcement Agencies, Press Release dated Apr. 28, 1999.

(Continued)

*Primary Examiner*—Nathan J. Flynn
*Assistant Examiner*—Mohamed Wasel
(74) *Attorney, Agent, or Firm*—Christensen O'Connor Johnson Kindness PLLC

(57) ABSTRACT

A system and method for evaluating data in a monitoring network are provided. A processing server obtains monitoring device data from a number of monitoring devices. The processing server processes and stores the monitoring device data according to one or more unique identifiers. Utilizing decision logic, the processing server evaluates the monitoring device data to generate one or more predictive assessments. Each predictive assessment can result in the initiation of actions or notification of authorized personnel based upon the likelihood of a target event occurring.

73 Claims, 8 Drawing Sheets

U.S. PATENT DOCUMENTS

| | | | |
|---|---|---|---|
| 5,475,375 A | 12/1995 | Barrett et al. | |
| 5,475,378 A | 12/1995 | Kaarsoo et al. | |
| 5,491,511 A | 2/1996 | Odle | |
| 5,499,356 A | 3/1996 | Eckert et al. | |
| 5,506,986 A | 4/1996 | Healy | |
| 5,541,911 A | 7/1996 | Nilakantan et al. | |
| 5,544,062 A | 8/1996 | Johnston, Jr. | |
| 5,600,368 A | 2/1997 | Matthews, III | |
| 5,614,890 A | 3/1997 | Fox | |
| 5,619,183 A | 4/1997 | Ziegra et al. | |
| 5,629,981 A | 5/1997 | Nerlikar | |
| 5,654,696 A | 8/1997 | Barrett et al. | |
| 5,664,186 A | 9/1997 | Bennett et al. | |
| 5,675,738 A | 10/1997 | Suzuki et al. | |
| 5,678,039 A | 10/1997 | Hinks et al. | |
| 5,680,328 A | 10/1997 | Skorupski et al. | |
| 5,682,142 A | 10/1997 | Loosmore et al. | |
| 5,717,379 A | 2/1998 | Peters | |
| 5,729,471 A | 3/1998 | Jain et al. | |
| 5,732,232 A | 3/1998 | Brush, II et al. | |
| 5,742,286 A | 4/1998 | Kung et al. | |
| 5,758,340 A | 5/1998 | Nail | |
| 5,768,119 A | 6/1998 | Havekost et al. | |
| 5,771,354 A | 6/1998 | Crawford | |
| 5,810,747 A | 9/1998 | Brudny et al. | |
| 5,813,009 A | 9/1998 | Johnson et al. | |
| 5,821,855 A | 10/1998 | Lewis | |
| 5,838,368 A | 11/1998 | Masunaga et al. | |
| 5,838,682 A | 11/1998 | Dekelbaum et al. | |
| 5,844,501 A | 12/1998 | El-Ibiary | |
| 5,848,143 A | 12/1998 | Andrews et al. | |
| 5,870,733 A | 2/1999 | Bass et al. | |
| 5,872,594 A | 2/1999 | Thompson | |
| 5,879,163 A | 3/1999 | Brown et al. | |
| 5,903,455 A | 5/1999 | Sharpe, Jr. et al. | |
| 5,903,730 A | 5/1999 | Asai et al. | |
| 5,905,436 A | 5/1999 | Dwight et al. | |
| 5,917,405 A | 6/1999 | Joao | |
| 5,923,264 A | 7/1999 | Lavelle et al. | |
| 5,937,415 A | 8/1999 | Sheffield et al. | |
| 5,943,673 A | 8/1999 | Felouzis et al. | |
| 5,960,174 A | 9/1999 | Dew | |
| 5,963,131 A | 10/1999 | D'Angelo et al. | |
| 5,982,362 A | 11/1999 | Crater et al. | |
| 5,987,519 A | 11/1999 | Peifer et al. | |
| 5,990,885 A | 11/1999 | Gopinath | |
| 6,002,994 A | 12/1999 | Lane et al. | |
| 6,011,547 A | 1/2000 | Shiota et al. | |
| 6,012,100 A | 1/2000 | Frailong et al. | |
| 6,023,223 A | 2/2000 | Baxter, Jr. | |
| 6,031,455 A | 2/2000 | Grube et al. | |
| 6,041,347 A | 3/2000 | Harsham et al. | |
| 6,064,316 A | 5/2000 | Glick et al. | |
| 6,064,723 A | 5/2000 | Cohn et al. | |
| 6,070,228 A | 5/2000 | Belknap et al. | |
| 6,075,553 A | 6/2000 | Freeman et al. | |
| 6,076,111 A | 6/2000 | Chiu et al. | |
| 6,085,227 A | 7/2000 | Edlund et al. | |
| 6,091,771 A | 7/2000 | Seeley et al. | |
| 6,115,040 A | 9/2000 | Bladow et al. | |
| 6,133,941 A | 10/2000 | Ono | |
| 6,157,935 A | 12/2000 | Tran et al. | |
| 6,157,956 A | 12/2000 | Jensen et al. | |
| 6,166,729 A | 12/2000 | Acosta et al. | |
| 6,167,358 A | 12/2000 | Othmer et al. | |
| 6,182,142 B1 | 1/2001 | Win et al. | |
| 6,185,316 B1 | 2/2001 | Buffam | |
| 6,188,973 B1 | 2/2001 | Martinez et al. | |
| 6,219,439 B1 | 4/2001 | Burger | |
| 6,226,031 B1 | 5/2001 | Barraclough et al. | |
| 6,229,429 B1 | 5/2001 | Horon | |
| 6,233,588 B1 | 5/2001 | Marchoili et al. | |
| 6,239,833 B1 | 5/2001 | Ozaki et al. | |
| 6,243,129 B1 | 6/2001 | Deierling | |
| 6,250,452 B1 | 6/2001 | Partyka et al. | |
| 6,271,752 B1 | 8/2001 | Vaios | |
| 6,271,805 B1 | 8/2001 | Yonezawa | |
| 6,281,790 B1 * | 8/2001 | Kimmel et al. | 340/506 |
| 6,289,380 B1 | 9/2001 | Battat et al. | |
| 6,297,746 B1 | 10/2001 | Nakazawa et al. | |
| 6,298,474 B1 | 10/2001 | Blowers et al. | |
| 6,304,857 B1 | 10/2001 | Heindel et al. | |
| 6,308,205 B1 | 10/2001 | Carcerano et al. | |
| 6,311,210 B1 | 10/2001 | Foladare et al. | |
| 6,324,647 B1 | 11/2001 | Bowman-Amuah | |
| 6,356,949 B1 | 3/2002 | Katsandres et al. | |
| 6,362,836 B1 | 3/2002 | Shaw et al. | |
| 6,366,686 B1 | 4/2002 | Schroeder et al. | |
| 6,369,695 B1 | 4/2002 | Horon | |
| 6,393,387 B1 | 5/2002 | Adriaans et al. | |
| 6,412,359 B1 | 7/2002 | Zborowski et al. | |
| 6,429,893 B1 | 8/2002 | Xin | |
| 6,430,712 B2 * | 8/2002 | Lewis | 714/47 |
| 6,430,740 B1 | 8/2002 | Hart et al. | |
| 6,446,200 B1 | 9/2002 | Ball et al. | |
| 6,460,141 B1 | 10/2002 | Olden | |
| 6,483,878 B1 | 11/2002 | Yonezawa | |
| 6,498,987 B1 | 12/2002 | Kelly et al. | |
| 6,499,054 B1 | 12/2002 | Hesselink et al. | |
| 6,504,479 B1 | 1/2003 | Lemons et al. | |
| 6,519,540 B1 | 2/2003 | Salandro | |
| 6,529,475 B1 | 3/2003 | Wan et al. | |
| 6,529,936 B1 | 3/2003 | Mayo et al. | |
| 6,542,075 B2 | 4/2003 | Barker et al. | |
| 6,553,336 B1 | 4/2003 | Johnson et al. | |
| 6,564,380 B1 | 5/2003 | Murphy | |
| 6,567,536 B2 | 5/2003 | McNitt et al. | |
| 6,580,451 B2 | 6/2003 | Yonezawa et al. | |
| 6,583,720 B1 | 6/2003 | Quigley | |
| 6,598,090 B2 | 7/2003 | Champlin | |
| 6,611,206 B2 | 8/2003 | Eshelman et al. | |
| 6,631,271 B1 | 10/2003 | Logan | |
| 6,646,675 B1 | 11/2003 | Tang et al. | |
| 6,654,060 B1 | 11/2003 | Kurosawa et al. | |
| 6,686,838 B1 | 2/2004 | Rezvani et al. | |
| 6,697,103 B1 | 2/2004 | Fernandez et al. | |
| 6,697,341 B1 | 2/2004 | Roy | |
| 6,698,021 B1 | 2/2004 | Amini et al. | |
| 6,704,284 B1 | 3/2004 | Stevenson et al. | |
| 6,714,977 B1 * | 3/2004 | Fowler et al. | 709/224 |
| 6,721,391 B2 | 4/2004 | McClelland et al. | |
| 6,738,811 B1 | 5/2004 | Liang | |
| 6,741,171 B2 | 5/2004 | Palka et al. | |
| 6,748,446 B2 | 6/2004 | Sato et al. | |
| 6,754,546 B1 | 6/2004 | Hindus et al. | |
| 6,839,850 B1 | 1/2005 | Campbell et al. | |
| 6,889,264 B2 | 5/2005 | Clough et al. | |
| 6,904,458 B1 | 6/2005 | Bishop et al. | |
| 6,938,022 B1 | 8/2005 | Singhal | |
| 6,947,988 B1 | 9/2005 | Saleh | |
| 6,954,701 B2 | 10/2005 | Wolfe | |
| 6,954,859 B1 | 10/2005 | Simerly et al. | |
| 6,960,998 B2 | 11/2005 | Menard et al. | |
| 6,970,167 B1 | 11/2005 | Kumamoto et al. | |
| 6,970,183 B1 | 11/2005 | Monroe | |
| 7,000,014 B2 | 2/2006 | Poisson et al. | |
| 7,003,670 B2 | 2/2006 | Heaven et al. | |
| 7,013,334 B2 | 3/2006 | Toyoshima et al. | |
| 7,035,332 B2 | 4/2006 | He et al. | |
| 7,039,205 B1 | 5/2006 | Carter et al. | |
| 7,053,767 B2 | 5/2006 | Petite et al. | |
| 7,069,234 B1 | 6/2006 | Cornelius et al. | |
| 7,123,700 B1 | 10/2006 | Weaver, III et al. | |
| 7,124,427 B1 | 10/2006 | Esbensen | |

| | | | |
|---|---|---|---|
| 7,190,292 B2 | 3/2007 | Bizjak | |
| 2001/0034754 A1 | 10/2001 | Elwahab et al. | |
| 2002/0019945 A1 | 2/2002 | Houston et al. | |
| 2002/0029263 A1 | 3/2002 | Toyoshima et al. | |
| 2002/0031230 A1 | 3/2002 | Sweet et al. | |
| 2002/0051061 A1* | 5/2002 | Peters et al. | 348/207 |
| 2002/0087289 A1* | 7/2002 | Halabieh | 702/181 |
| 2002/0120727 A1 | 8/2002 | Curley et al. | |
| 2002/0138663 A1* | 9/2002 | Ladwig | 709/318 |
| 2002/0171551 A1 | 11/2002 | Eshelman et al. | |
| 2002/0188854 A1 | 12/2002 | Heaven et al. | |
| 2002/0191639 A1 | 12/2002 | Norby | |
| 2002/0198990 A1* | 12/2002 | Bradfield et al. | 709/224 |
| 2003/0131065 A1 | 7/2003 | Neufeld et al. | |
| 2003/0167153 A1* | 9/2003 | Alexander | 702/189 |
| 2003/0172138 A1 | 9/2003 | McCormack et al. | |
| 2004/0098623 A1* | 5/2004 | Scheidell | 713/201 |
| 2004/0132432 A1 | 7/2004 | Moores et al. | |
| 2005/0222820 A1* | 10/2005 | Chung | 702/188 |
| 2005/0248474 A1 | 11/2005 | Wiser et al. | |
| 2006/0041616 A1 | 2/2006 | Ludwig et al. | |
| 2006/0277299 A1* | 12/2006 | Baekelmans et al. | 709/224 |
| 2007/0150955 A1* | 6/2007 | Murase et al. | 726/23 |
| 2007/0226796 A1* | 9/2007 | Gilbert et al. | 726/22 |
| 2007/0296817 A1* | 12/2007 | Ebrahimi et al. | 348/161 |
| 2008/0091490 A1* | 4/2008 | Abrahams et al. | 705/7 |
| 2008/0109879 A1* | 5/2008 | Bhagwat et al. | 726/3 |

FOREIGN PATENT DOCUMENTS

| | | | |
|---|---|---|---|
| WO | WO 97/07486 A | 2/1997 | |
| WO | WO 01/28251 | 4/2001 | |

OTHER PUBLICATIONS

EyeCast.com Adds 360-degree Continuous Pan Rotation Cameras to It's[sic] EyeView Service, Press Release dated Mar. 15, 1999.

Screen Printing from www.remotecams.com, "Take a Step Into the Future . . . ," printed Sep. 17, 1999.

EyeCast.com, "EyeCast secures deals . . . ," *Washington Business Journal*, Aug. 13-19, 1999, Tech Section, p. 16.

EyeCast.com Announces EyeView Control, Press Release dated Oct. 12, 1998.

EyeCast Announces EyeCapture Services, Press Release dated Jul. 8, 1998.

EyeCast.com, Inc., "Providing Live Interactive Video for Surveillance & Monitoring Over the Internet".

Axis Communications, publication entitled "Axis 200+ Web Camera".

Axis Communications, publication entitled "Axis 240 Camera Server".

Axis Communications, www.axis.se/products/cam_240/, "30 Frames/Second," printed Sep. 28, 1999.

Axis Communications, ww.axis.se/products/camera_servers/cam_app_sol.htm, "Network Cameras Applications and Solutions," printed Sep. 28, 1999.

Axis Communications, www.axis.se/products/camera_servers/cam_fb.html, "Features and Benefits," printed Sep. 28, 1999.

Muller, N.J., "Focus on Openview: A Guide to Hewlett-Packard's Network and Systems Management Platforms," CBM Books, Fort Washington, Pennsylvania, 1995, pp. 123-133.

* cited by examiner

SYSTEM AND METHOD FOR PERFORMING A PREDICTIVE THREAT ASSESSMENT BASED ON RISK FACTORS

CROSS-REFERENCE TO RELATED APPLICATION

This application claims the benefit of U.S. Provisional Patent Application No. 60/352,094, filed Jan. 25, 2002. Provisional Application No. 60/352,094 is specifically incorporated herein by reference.

FIELD OF THE INVENTION

In general, the present invention relates to computer software, hardware and communication networks, and in particular, to a system and method for predictive data assessment in a monitoring network.

BACKGROUND OF THE INVENTION

Generally described, monitoring systems are used to obtain information from a variety of elements. In a representative use, a security monitoring system may provide real-time data reflecting the current status of a monitored environment, such as a physical location within a given premises. For example, a security guard may use a computer terminal to obtain video data from a number of cameras in order to assess the status of a premises. Accordingly, many conventional security monitoring systems can assist users in evaluating whether a security breach, or other monitoring issue, has occurred (e.g., whether there is an unauthorized presence within the premises). Further, some security monitoring systems, upon the detection of a condition, are operable to initiate a number of reactive measures. For example, the monitoring system may alert an appropriate authority, or notify one or more authorized users.

Although the traditional security monitoring system obtains information regarding the status of various aspects of a monitored environment, such as the status of physical devices or the presence or location of individuals, the outputs from most traditional security monitoring network data are fundamentally reactive in nature. With reference to the previous example, if a security monitoring system obtains motion detection data from a monitored premises, the data output, for the traditional security monitoring network is typically limited to a determination of whether motion occurred and whether the detected motion is authorized. Both of these outputs are reactive in nature. Similarly, if a security monitoring network obtains live video data, the data output for the traditional monitoring network will be a transmission of the incoming video data to a display terminal, or more reactive, the archival of the video data. Clearly, the traditional security monitoring network cannot predict when motion will be detected or what the contents of the video motion may be. Thus, most, if not all, monitoring networks, are designed for, and therefore limited to, reactive data processing.

Although it may not be possible to predict events, particularly those linked to human behavior, with total accuracy, there are a variety of situations in which one or more factors may be utilized to establish a likelihood of an event occurring. In some limited situations, a single inputted factor, or condition, may have a sufficiently strong association with a target event such that the presence of the factor will likely determine whether the target event will occur. More commonly, however, the presence of a number of inputted factors, which if considered in isolation would have a limited association with a target event, may cumulatively indicate the likelihood of the target event occurring.

As applied to security monitoring networks and security processing services, the processing of data for the purpose of to the identifying an individual, such as facial recognition, fingerprint, retinal scan, and the like, may be useful for assessing security threats when the data used to identify an individual is linked to data linking that individual to a potential threat, based upon past behavior or other known risk factors In many instances, the risk factors may be unrelated to a specific individual, such as a state of alert at a premises. There are a number of situations in which the processing of multiple data inputs to produce a predictive threat assessment, that is, to process multiple data inputs to assess the likelihood of a target event, is clearly beneficial.

With reference to a security monitoring system implementation, there is an undeniable benefit from generating a threat assessment based on processing a wide variety of factors. For example, considered in isolation, the purchasing of a one-way airline ticket may not pose a sufficient threat to require additional investigation on behalf of law enforcement authorities. However, if the one-way ticket purchase is considered in conjunction with information, such as the purchase of the ticket with cash or the absence of checked baggage, the cumulative information could generate a threat assessment requiring at least some additional follow up, such as an automated notification to a perform an search at a security checkpoint. With another potential embodiment, a storeowner may wish to generate a reward assessment based upon predicted consumer's actions. In these situations, and many others, the data inputs can be interpreted to facilitate future actions. In each of these examples, however, because the assessment is not reactive, conventional monitoring systems are not well suited to provide such services.

Thus, there is a need for a system and method for utilizing associative monitoring data, such as biometric data, to generate future threat assessments. More specifically, there is a specific need for a system and method for utilizing associative security monitoring data to generate predictive threat assessments.

SUMMARY OF THE INVENTION

A system and method for evaluating data in a monitoring network are provided. A processing server obtains monitoring device data from a number of monitoring devices. The processing server processes and stores the monitoring device data according to one or more unique identifiers. Utilizing decision logic, the processing server evaluates the monitoring device data to generate one or more predictive assessments. Each predictive assessment can result in the initiation of actions or notification of authorized personnel based upon the likelihood of a target event occurring.

In accordance with an aspect of the present invention, a system for processing monitoring device data is provided. The system includes at least one monitoring device for obtaining monitoring device data corresponding to at least one identifiable target. The system also includes a first processing server for obtaining the monitoring device data and processing the monitoring device data according to at least one processing rule. The system further includes a processing rules data store having processing rules corresponding to one or more targets in a monitored premises. The first processing server utilizes processing rules from the processing rules data store to perform a predictive analysis on the monitoring device data and to generate at least one output indicative of a result of the predictive analysis.

In accordance with another aspect of the present invention, a method for processing monitoring device is provided. The method may be implemented in a monitoring device system having at least one monitoring device, a processing system, and a processing rules data store. In accordance with the method, a processing system obtains monitoring device data corresponding to at least one identifiable target. The processing system obtains at least one processing rule corresponding to the identifiable target from the processing rules data store. The processing system processes the monitoring device data according to the at least one processing rule. The processing of the monitoring device data includes performing a predictive analysis of the monitoring device data. The processing system further generates an output corresponding to the processing of the monitoring device data.

In accordance with a further aspect of the present invention, a system for processing monitoring device data is provided. The system includes at least one information collection computing device for obtaining monitoring device data from a number of monitoring devices. The monitoring device data corresponds to at least one identifiable target. The system further includes a central processing server in communication with the at least one information collection computing device and operable to receive the monitoring device data corresponding to at least one identifiable target. The system also includes a processing rules data store having processing rules corresponding to one or more identifiable targets. The central processing server obtains a processing rule corresponding to the at least one target, performs a predictive analysis of the monitoring device data according to the processing rule, and generates at least one output corresponding to the predictive analysis.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
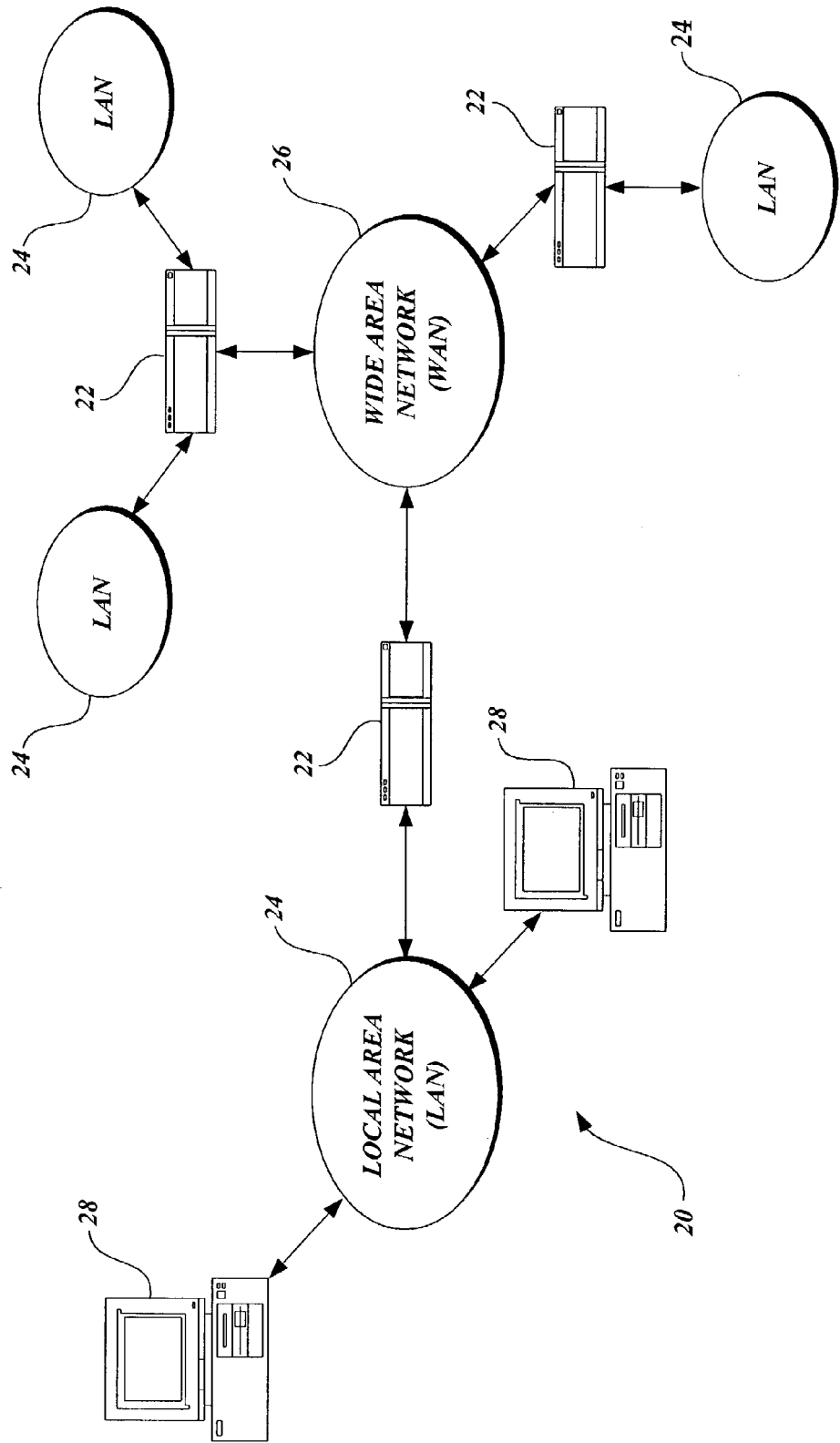
FIG. 1 is a block diagram of a representative portion of the Internet.

As described above, aspects of the present invention are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, where a plurality of local area networks ("LANs") 24 and a wide area network ("WAN") 26 are interconnected by routers 22. The routers 22 are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers 28 and other related electronic devices can be remotely connected to either the LANs 24 or the WAN 26 via a digital communications device, modem and temporary telephone, or a wireless link. It will be appreciated that the Internet 20 comprises a vast number of such interconnected networks, computers, and routers and that only a small, representative section of the Internet 20 is shown in FIG. 1.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided in America Online or other online service providers, as well as the "wireless Web" provided by various wireless networking providers, especially those in the cellular phone industry. It will be appreciated that the present invention could apply in any such interactive communication environments, however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any Web server, the document is considered retrieved from the World Wide Web. Known to those skilled in the art, a Web server may also include facilities for storing and transmitting application programs, such as application programs written in the JAVA® programming language from Sun Microsystems, for execution on a remote computer. Likewise, a Web server may also include facilities for executing scripts and other application programs on the Web server itself.

A remote access user may retrieve hypertext documents from the World Wide Web via a Web browser program. A Web browser, such as Netscape's NAVIGATOR® or Microsoft's Internet Explorer, is a software application program for providing a user interface to the WWW. Upon request from the remote access user via the Web browser, the Web browser requests the desired hypertext document from the appropriate Web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the Web server, such as JAVA applets, for execution on the client computer. Finally, the WWW browser may include optional software components, called plug-ins, that run specialized functionality within the browser.

Figure 2:
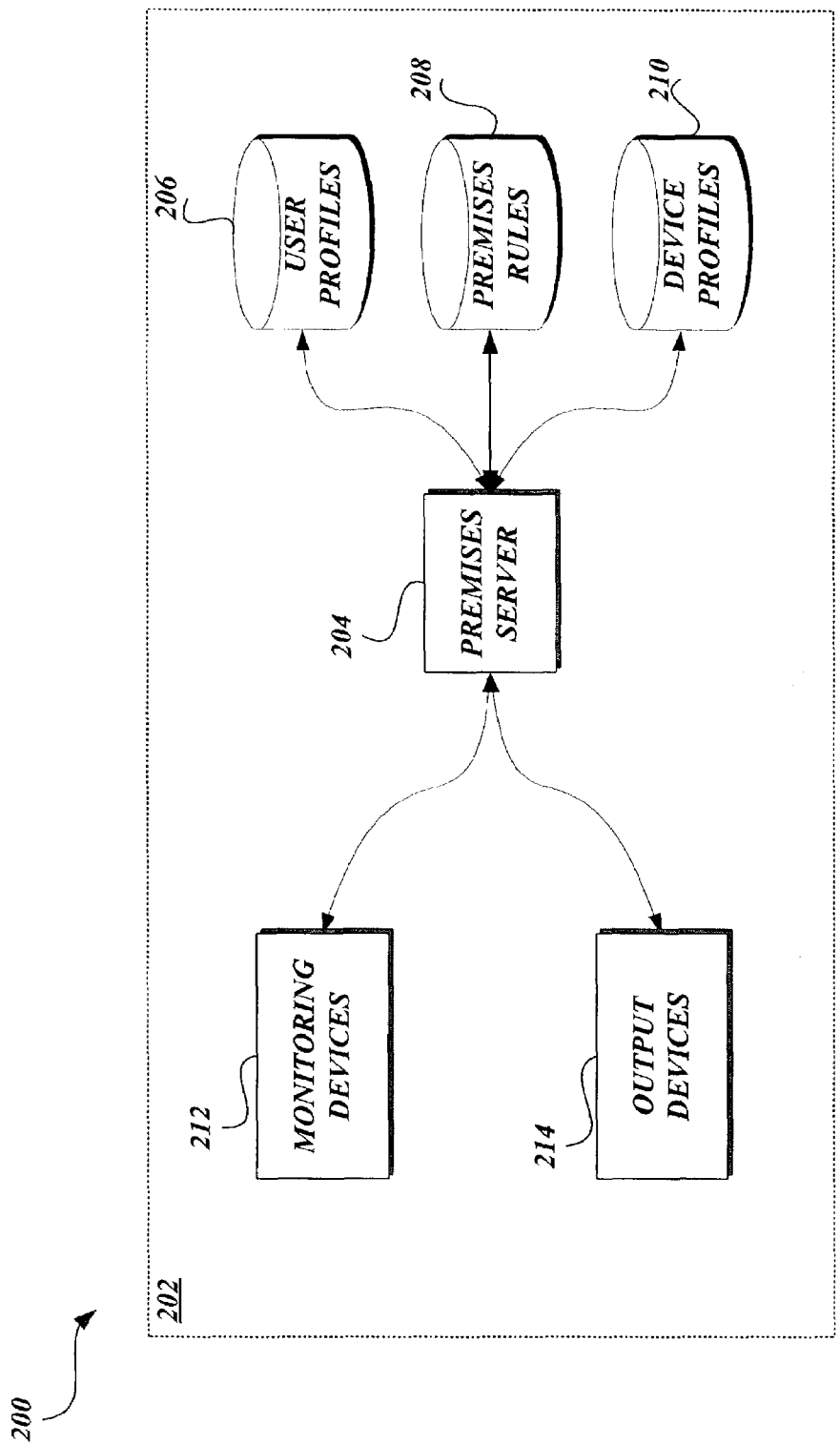
FIG. 2 is a block diagram of an action assessment system formed in accordance with the present invention.

Referring now to FIG. 2, an actual embodiment of an action assessment system 200 formed in accordance with the present invention will be described. The action assessment system 200 facilitates the processing of multiple data inputs obtained from a number of monitoring devices located within one or more physical premises. The action assessment system processes the monitoring device data according to one or more processing rules, which can be system controlled or premises-specific. Based on an evaluation of the inputs and a corresponding rule, the action assessment system 200 generates an action assessment. Accordingly, the system 200 can implement a system response, including the request and processing of additional information. In an illustrative embodiment of the present invention, the action assessment system 200 may be utilized to generate security threat assessments. However, one skilled in the relevant art will appreciate that the present invention is not limited to a security threat assessment system and that the disclosed embodiments are illustrative in nature.

With reference to FIG. 2, the action assessment system 200 includes a premises server 204 assigned to a premises 202 or group of premises 202. In an illustrative embodiment of the present invention, the premises server 204 is located physically proximate to the premises 202. Alternately, the premises server 204 may be remote, or physically separated from the premises 202. Moreover, although a single premises server 204 is illustrated in FIG. 2, any number of computing devices may be utilized to implement the present invention.

In accordance with an illustrative embodiment of the present invention, the premises server 204 is in communication with a number of data sources for facilitating communication with various monitoring and output devices, for evaluating premises specific rules and/or for storing the inputted data for evaluation. More specifically, the premises server 204 is in communication with a user profiles database 206 operable to store and recall monitoring device data associated with one or more unique identifiers. The premises server 204 is also in communication with a premises rules database 208. The premises rules database 208 is operable to recall one or more premises specific rules for evaluating the monitoring data. As will be explained in further detail below, premises rules database 208 can include programmatic and declarative rules for utilization by processing systems, including but not limited to individual automata, neural networks, support vector machines and any additional learning systems. The premises server 204 is further in communication with a device profiles database 210 that includes information operable to control and interpret communications from the various monitoring and output devices connected to the premises server 204. One skilled in the relevant art will appreciate that various control methods may be utilized within the present invention to control the monitoring and output devices and obtain corresponding information. Further, one skilled in the relevant art will appreciate that the user profiles database 206, the premises rules database 208 and the device profiles database 210 may be physically remote from the premises server 204 and may be implemented as part of a distributed database network.

As also illustrated in FIG. 2, the premises server 204 can communicate with one or more monitoring devices 212 via a network connection. A more detailed description of a network for communicating with monitoring devices, including the use of one or more device servers, is found in co-pending U.S. Provisional Application No. 60/281,254, entitled SYSTEM AND METHOD FOR MANAGING A DEVICE NETWORK and filed on Apr. 3, 2001, the disclosure of which is hereby incorporated by reference. In an illustrative embodiment, the monitoring devices 212 can include smoke, fire and carbon monoxide detectors. The monitoring devices 212 can also include door and window access detectors, glass break detectors, motion detectors, audio detectors, metal detectors, explosive detectors and/or infrared detectors. Still further, the monitoring devices 212 can include computer network monitors, voice identification devices, video cameras, still cameras, microphones and/or fingerprint, facial, retinal, or other biometric identification devices. Still further, the monitoring devices 212 may include pressure-sensitive mats or planar surfaces. Still further, the monitoring devices 212 can include conventional panic buttons, global positioning satellite ("GPS") locators, other geographic locators, medical indicators, and vehicle information systems. The monitoring devices 212 can also be integrated with other existing information systems, such as inventory control systems, accounting systems, reservation systems, point-of-sale ("POS") terminals/systems, and the like. It will be apparent to one skilled in the relevant art that additional or alternative monitoring devices 212 corresponding to a specific monitoring function may be practiced with the present invention.

The premises server 204 also communicates with one or more output devices 214. In an illustrative embodiment, the output devices 214 can include audio speakers, display or other audio/visual displays, or audio diaphragms for the projection of audio within targeted areas of a premises. The output devices 214 may also include electrical or electromechanical devices that allow the system to perform actions. The output devices 214 can include computer system interfaces, telephone interfaces, wireless interfaces, door and window locking mechanisms, aerosol sprayers, and the like. As will be readily understood by one skilled in the art, the type of output device is associated primarily with the type of action the action assessment system 200 generates. Accordingly, additional or alternative output devices 214 are considered to be within the scope of the present invention. In accordance with the present invention, the monitoring devices 212 and the output devices 214 can be linked together in a computer network environment in which multiple premises servers 202 work in parallel, sharing data and processes. Moreover, additional premises servers 202, monitoring devices 212, and output devices 214 may be joined modularly to provide extensibility to the system 200.

Figure 3:
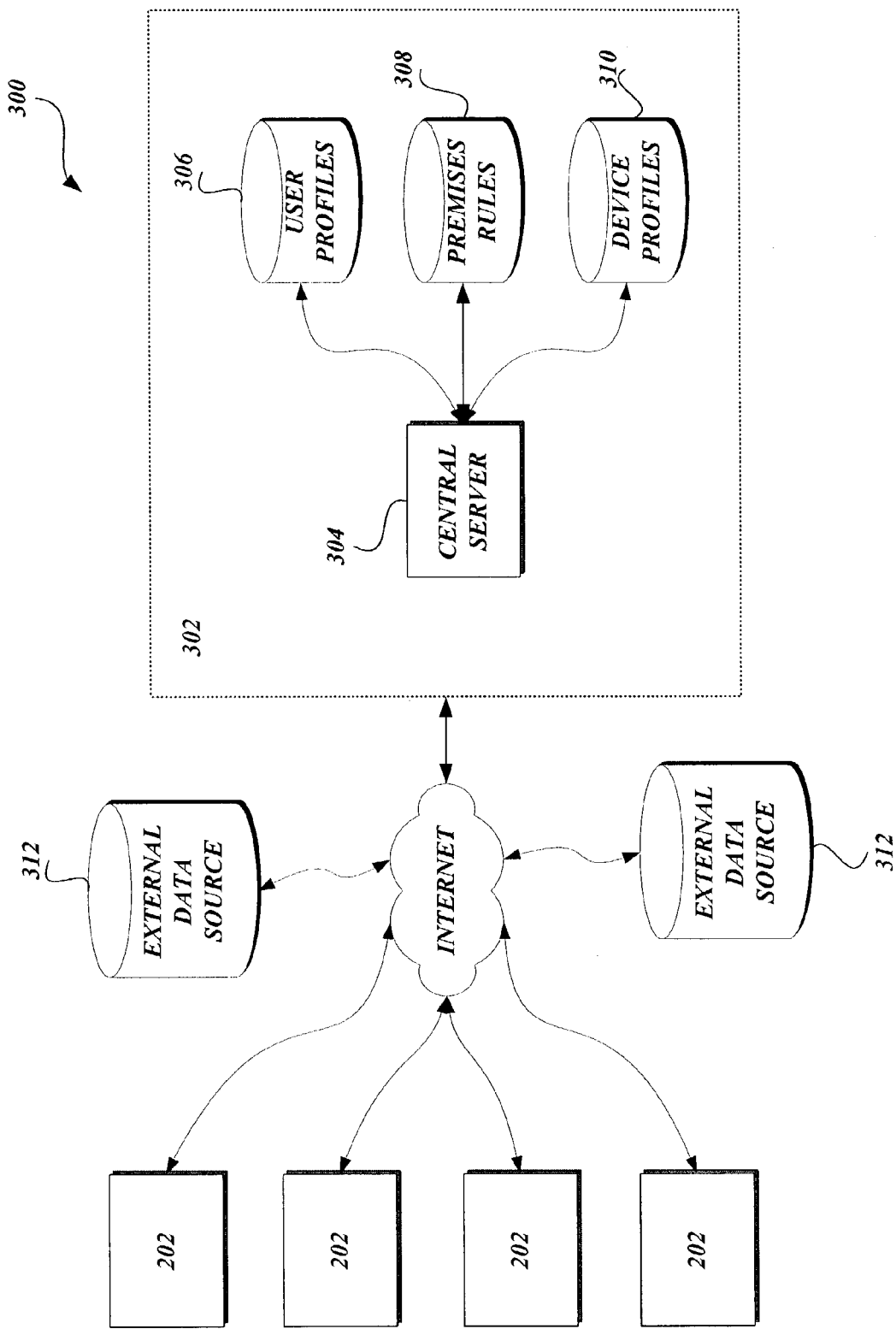
FIG. 3 is a block diagram illustrative of an action assessment system including a central processing server and one or more external data sources formed in accordance with the present invention.

Turning now to FIG. 3, an expanded embodiment of the present invention will be explained. In accordance with this embodiment, an action assessment system 300 includes a number of premises 202 and premises servers 204 that operate as described with respect to FIG. 2. Each of these premises 202 communicates to a central processing facility 302 that includes at least one central processing server 304. In an illustrative embodiment of the present invention, the individual premises 202 can communicate via global communication network such as the Internet 20, or alternatively via private communication networks and/or communication lines. Similar to the premises server 204, the central processing server 304 is in communication with a number of data sources to facilitate processing incoming monitoring device data from the premises 202 and communicating with various monitoring devices within each individual premises 202. More specifically, the central server 304 includes a user profiles database 306, a premises rules database 308, and a device profiles database 310. In an illustrative embodiment of the present invention, the central processing server 304 data sources have similar functions to the user profile database 206, premises rules database 208, and device profile database 210 (FIG. 2) and operable to add a second data processing layer to the action assessment system 300. More specifically, the user profiles database 306 is operable to store and recall user profile data for processing the various inputs from the monitoring device data. The premises rules database 308 is operable to provide rules for processing premises monitoring device-specific data. In an illustrative embodiment of the present invention, the premises rules database may maintain individually customized rules for each premises 202 on the system 300 or a set of rules applicable to each premises. Finally, the device profiles database 310 is operable to interpret and/or control the various monitoring devices from each premises 202. Similar to the premises databases, the central server databases may be physically proximate to the central server 304, may be remote or physically separate from the central server 304 and implemented as part of a distributed database system.

The action assessment system 300 can also include one or more external data sources 312, operable to supply additional information to the central processing server 304. In an illustrative embodiment of the present invention, the external data sources 312 can include law enforcement databases, governmental databases, international databases, internal company databases, third-party commercial databases, and the like.

In accordance with this embodiment of the present invention, the premises server 204 can obtain and process monitoring device data. As part of the processing, the premises server 204 can transmit the monitoring device data and any processing results to the central processing server 204. The central server can obtain the data from the individual premises 202, process it according to its premises rules to generate an action assessment. Additionally, the central processing server 304 may also obtain additional information, such as from the external data sources 312, as part of the data processing step, or as a result of a preliminary data processing. For example, the central server 304 could obtain an action assessment and monitoring device data from an individual premises server 204, and then request additional information from an external data source 312, such as an FBI record database. In conjunction with its processing rules and the additional data, the central processing server 304 may generate one or more action assessments and implement any number of actions. Accordingly, an action assessment system 300 can implement multiple layers for processing.

Although a single central processing server 304 is illustrated in FIG. 3, one skilled in the relevant art will appreciate that any number of central processing servers 304 may be implemented to process data from premises servers 204. Moreover, multiple central processing servers 304 may be utilized within an action assessment system 300 to generate any number of processing layers. For example, a second central processing server 304 may be utilized to process data from the first central processing server 304.

Figure 4:
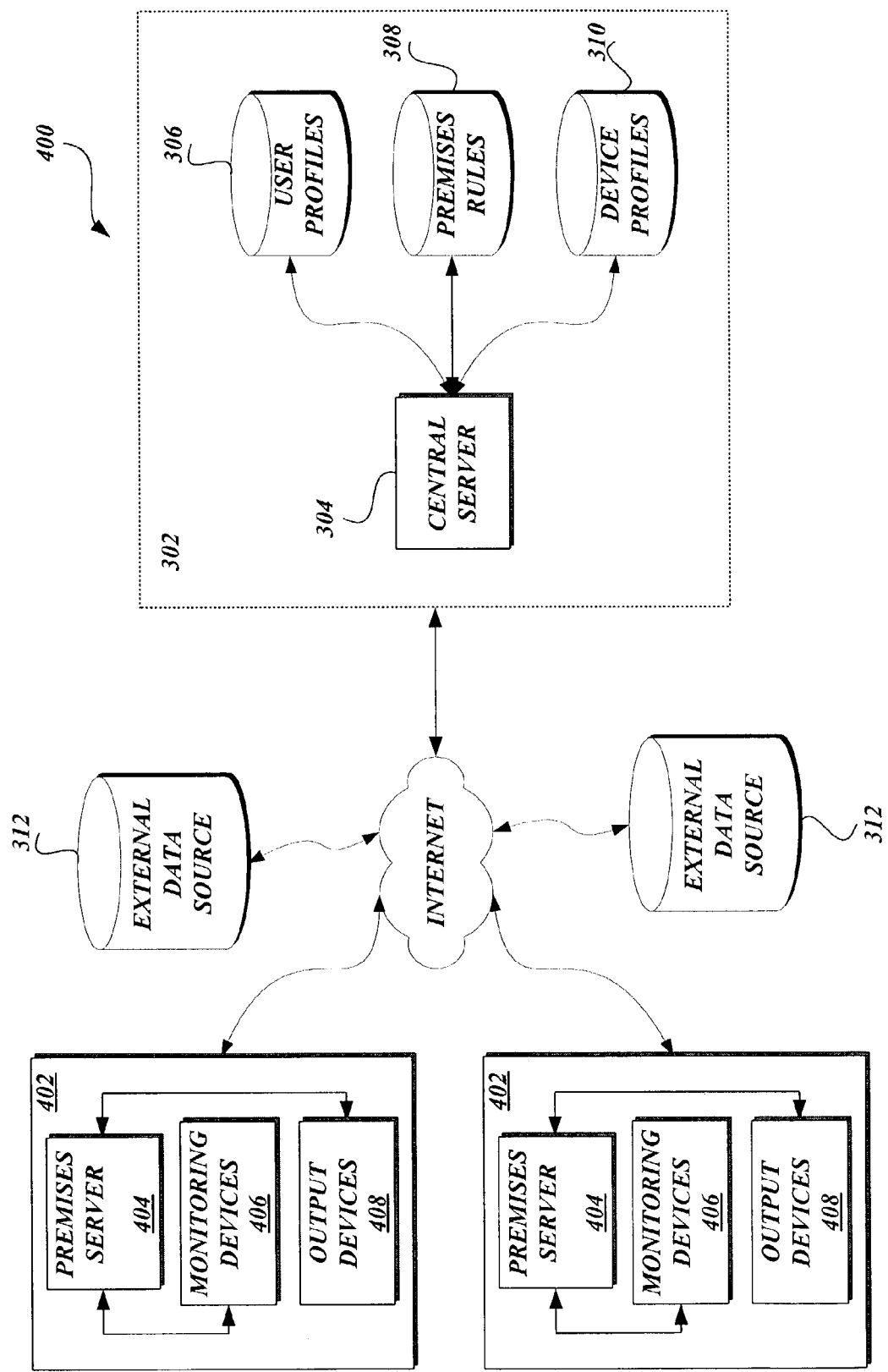
FIG. 4 is a block diagram illustrative of an action assessment system including a central server and two external data sources formed in accordance with an alternative embodiment of the present invention.

With reference now to FIG. 4, an alternative embodiment for an action assessment system 400 will be described. In accordance with this embodiment, the action assessment system 400 includes a number of premises 402 that include a premises server 404, monitoring devices 406, and output devices 408. However, the premises server 404 does not include additional data sources, such as a user profile database, a premises rule database or device profile database, to process the monitoring device data. Instead, all of the monitoring device and output device data is transferred to a central server 304 which evaluates monitoring device data according to the user profile database 306, a premises rule database 308, and a device profiles database 310, described above. The central server 304 can obtain additional external data from an external data source 312. However, one skilled in the art will appreciate that the central server 304 can then transfer the data to an additional layer (not shown) to implement additional processing layers.

In accordance with this embodiment of the present invention, the individual premises 402 no longer have the ability to process the monitoring device data and transfer it to an external source. Additionally, in another embodiment of the present invention, the premises server 402 may also be omitted such that the monitoring devices 406 transmit data directly to the central server 304. Still further, the action assessment system 400 may be further modified to include a combination of premises 202 (FIG. 2) having a premises server 204 and premises 402 communicate unprocessed monitoring device data to a central processing server 304. All such embodiments are considered to be within the scope of the present invention.

Figure 5:
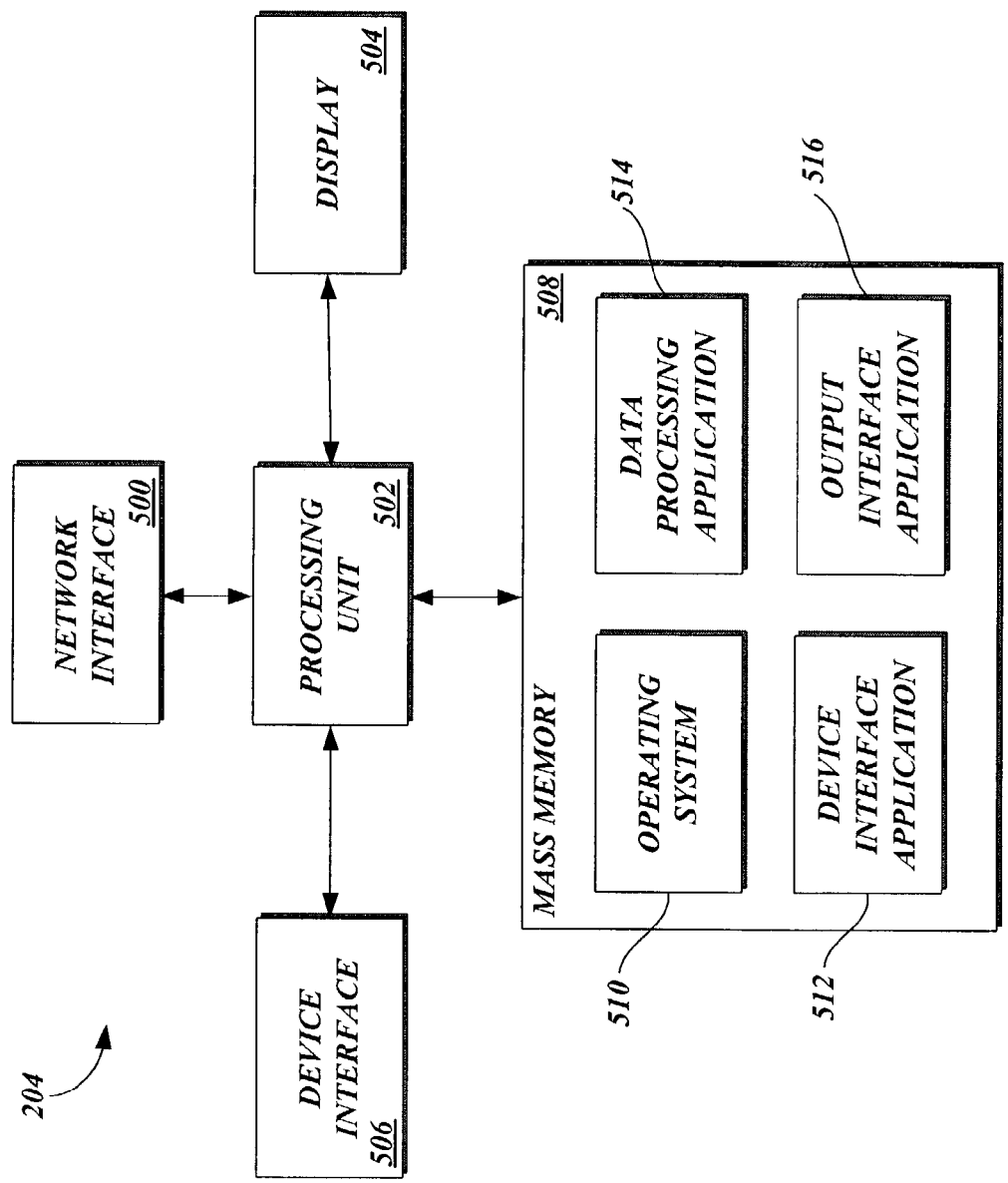
FIG. 5 is a block diagram of an illustrative architecture for a premises server formed in accordance with the present invention.

FIG. 5 is a block diagram depicting an illustrative architecture for a premises server 204 (FIG. 2). Those of ordinary skill in the art will appreciate that the premises server 204 includes many more components then those shown in FIG. 5. However, it is not necessary that all of these generally conventional components be shown in order to disclose an illustrative embodiment for practicing the present invention. As shown in FIG. 5, the premises server 204 includes a network interface 502 for connecting directly to a LAN or a WAN, or for connecting remotely to a LAN or WAN. Those of ordinary skill in the art will appreciate that the network includes the necessary circuitry for such a connection, and is also constructed for use with the TCP/IP protocol, the particular network configuration of the LAN or WAN it is connecting to, and a particular type of coupling medium. The premises server 204 may also be equipped with a modem for connecting to the Internet through a point-to-point protocol ("PPP") connection or a serial-line Internet protocol ("SLIP") connection as known to those skilled in the art.

The premises server 204 also includes a processing unit 504, an optional display 506, an input/output (I/O) interface 508 and a mass memory 510, all connected via a communication bus, or other communication device. The I/O interface 508 includes hardware and software components that facilitate interaction with a variety of the monitoring devices via a variety of communication protocols including TCP/IP, X10, digital I/O, RS-232, RS-485 and the like. Additionally, the I/O interface 44 facilitates communication via a variety of communication mediums including telephone landlines, wireless networks (including cellular, digital and radio networks), cable networks and the like. In an actual embodiment of the present invention, the I/O interface is implemented as a layer between the server hardware and software applications utilized to control the individual monitoring devices. It will be understood by one skilled in the relevant art that alternative interface configurations may be practiced with the present invention.

The mass memory 510 generally comprises a RAM, ROM, and a permanent mass storage device, such as a hard disk drive, tape drive, optical drive, floppy disk drive, or combination thereof. The mass memory 510 stores an operating system 512 for controlling the operation of the premises server. It will appreciated that this component may comprise a general-purpose server operating system as is known to those skilled in the art, such as UNIX, LINUX™, or Microsoft WINDOWS NT®. The memory also includes a WWW browser 50, such as Netscape's NAVIGATOR® or Microsoft's Internet Explorer browsers, for accessing the WWW.

The mass memory 510 also stores program code and data for interfacing with various premises monitoring devices, for processing the monitoring device data and for transmitting the processed data. More specifically, the mass memory 510 stores a device interface application 514 in accordance with the present invention for obtaining monitoring device data from a variety of devices and for manipulating the data for processing. The device interface application 514 comprises computer-executable instructions which, when executed by the premises server 204 obtains and transmits device data as will be explained below in greater detail. The mass memory 510 also stores a data processing application 512 for processing monitoring device data in accordance with rules maintained within the rules database 208. The mass memory 510 further stores an output interface application program 518 for transmitting processed device data to one or more external system components. The operation of the data transmittal application 516 will be described in greater detail below. It will be appreciated that these components may be stored on a computer-readable medium and loaded into the memory of the premises server using a drive mechanism associated with the computer-readable medium, such as a floppy, CD-ROM, DVD-ROM drive, or network drive.

Figure 6:
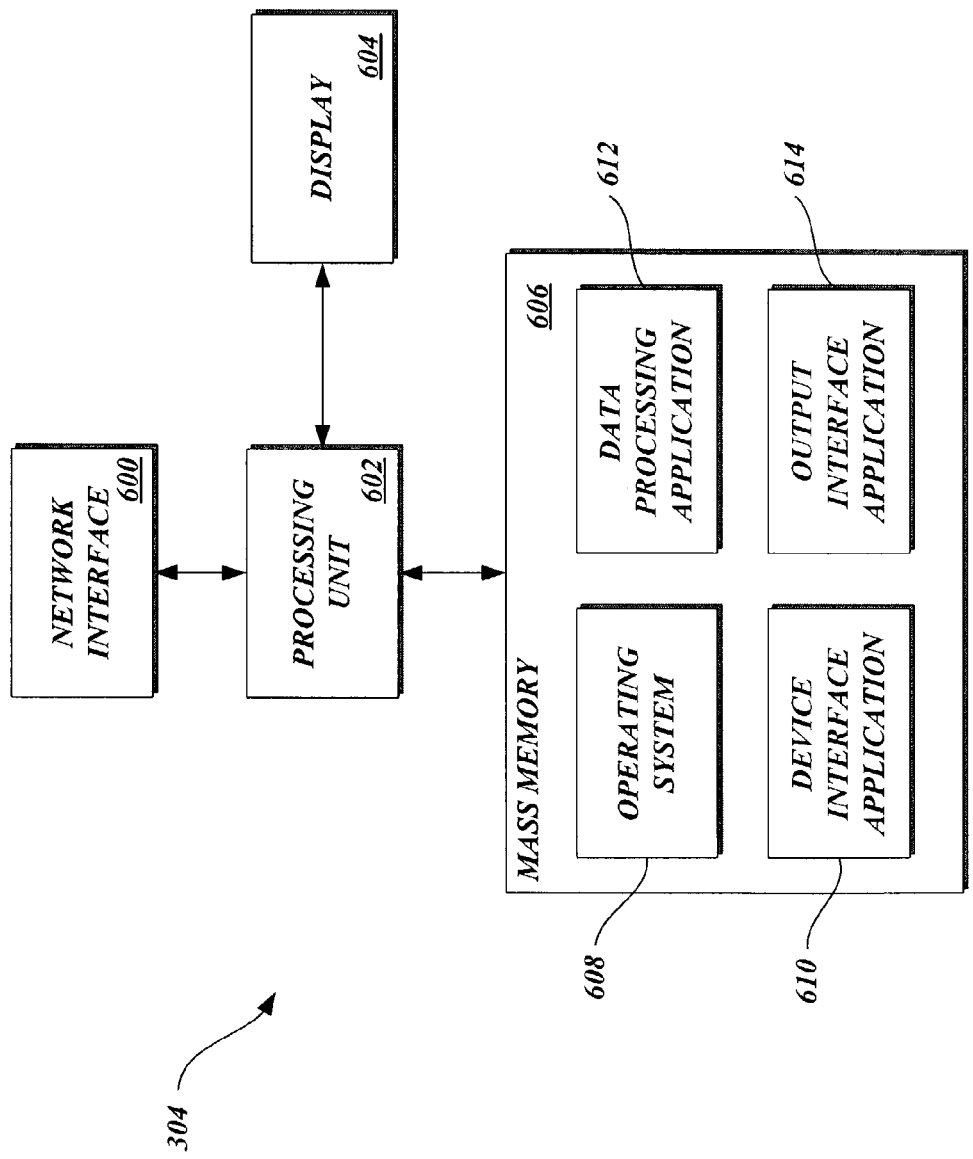
FIG. 6 is a block diagram of an illustrative architecture of a central processing server formed in accordance with the present invention.

FIG. 6 is a block diagram depicting an illustrative architecture for a central server 304 (FIG. 3). Those of ordinary skill in the art will appreciate that the central server 304 includes many more components then those shown in FIG. 6. However, it is not necessary that all of these generally conventional components be shown in order to disclose an illustrative embodiment for practicing the present invention.

As shown in FIG. 6, the central server 304 includes a network interface 600 for connecting directly to a LAN or a WAN, or for connecting remotely to a LAN or WAN. Those of ordinary skill in the art will appreciate that the network interface includes the necessary circuitry for such a connection, and is also constructed for use with the TCP/IP protocol, the particular network configuration of the LAN or WAN it is connecting to, and a particular type of coupling medium. The central server 304 may also be equipped with a modem for connecting to the Internet 20.

The central server 304 also includes a processing unit 602, an optional display 604 and a mass memory 606, all connected via a communication bus, or other communication device. The mass memory 606 generally comprises a RAM, ROM, and a permanent mass storage device, such as a hard disk drive, tape drive, optical drive, floppy disk drive, or combination thereof. The mass memory 606 stores an operating system 608 for controlling the operation of the central server. It will be appreciated that this component may comprise a general-purpose server operating system.

The mass memory 606 also stores program code and data for interfacing with the premises devices, for processing the device data and for interfacing with various authorized users. More specifically, the mass memory 606 stores a premises interface application 610 in accordance with the present invention for obtaining data from a variety of monitoring devices and for communicating with the premises server. The premises interface application 610 comprises computer-executable instructions, which, when executed by the central server 304, interface with the premises server 204 as will be explained below in greater detail. The mass memory 606 also stores a data processing application 612 for processing monitoring device data in accordance with rules maintained within the rules database 308. The operation of the data processing application 612 will be described in greater detail below. The mass memory 606 further stores an output interface application 614 for outputting the processed monitoring device data to a variety of authorized users or additional central processing servers 304 in accordance with the present invention. The operation of the output interface application 614 will be described in greater detail below. It will be appreciated that these components may be stored on a computer-readable medium and loaded into the memory of the central server using a drive mechanism associated with the computer-readable medium.

Generally described, the present invention facilitates the collection and processing of a variety of premises information to generate one or more action assessments of potential future activity. The system of the present invention obtains monitoring data from any one of a variety of monitoring devices 212. In an actual embodiment of the present invention, the monitoring device data can be categorized as asset data, resource data or event data. Asset data is obtained from a monitoring device corresponding to an identifiable object that is not capable of independent action. For example, asset data includes data obtained from a bar code or transponder identifying a particular object, such as a computer, in a particular location. Resource data is obtained from a monitoring device corresponding to an identifiable object that is capable of independent action. For example, resource data includes data from a magnetic card reader that identifies a particular person who has entered the premises. Event data is obtained from a monitoring device corresponding to an on/off state that is not correlated to an identifiable object. Event data is a default category for all of the monitoring devices. As will be readily understood by one skilled in the relevant art, alternative data categorizations are considered to be within the scope of the present invention.

In an illustrative embodiment of the present invention, the monitoring device data is obtained by the monitoring devices 212 on the premises server 204 and processed according to some form of decision logic. In an actual embodiment of the present invention, the premises server maintains databases 208 having logic rules for asset data, resource data and event data. Moreover, because the monitoring device data is potentially applicable to more than one authorized user, multiple rules may be applied to the same monitoring device data. Alternatively, the monitoring device data may be processed according to a weighted decision logic, such as a neural network, that does not utilize fixed decision logic. Still further, as illustrated in FIGS. 3 and 4, some or all of the monitoring device data may be processed by the central server 304 according to different processing layer logic rules maintained in the premises rules database 308.

Based on the evaluation of the decision logic, the premises server 204 can generate an action assessment corresponding to the outcome of the threat assessment (a determined likelihood of a target event occurring). In an illustrative embodiment of the present invention, the action assessment may be in the form of a numerical indicator that has one or more actions associated with it. For example, in an airline security monitoring embodiment, a numerical action assessment can cause law enforcement authorities to implement a pre-defined set of actions. In another embodiment of the present invention, the action assessment can be in the form of a set of customized actions initiated by the monitoring system. With reference to the airline security example, a customized action assessment can be in the form of a transfer of data to an individual, or group of individuals, that are determined to be relevant to the particular set of monitoring device data. Moreover, in yet another embodiment of the present invention, an action assessment system 200, 300 or 400 may utilize a combination of pre-determined numerical identifiers and customized actions.

Figure 7A:
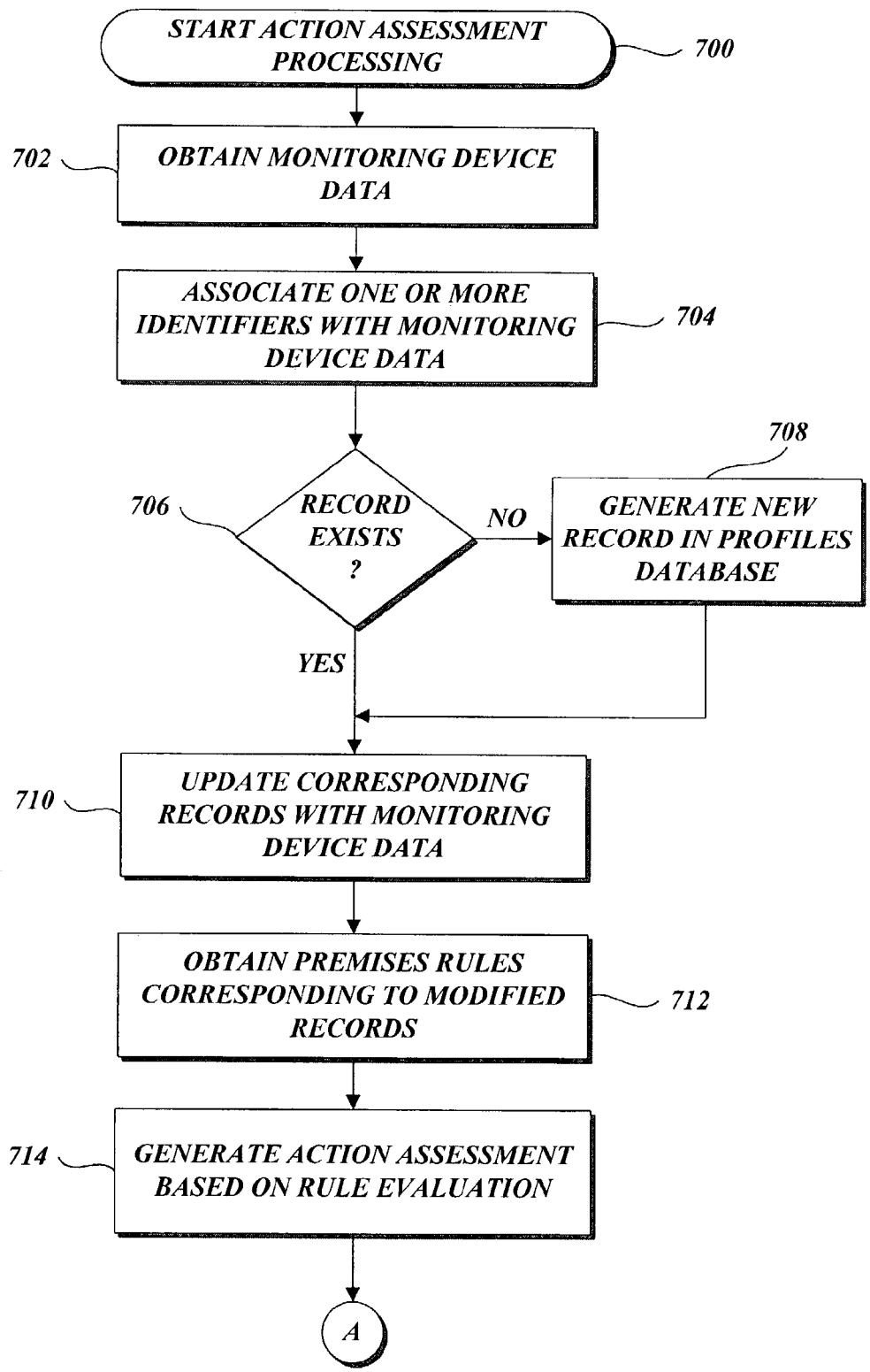
FIGS. 7A and 7B are flow diagrams illustrative of an action assessment processing routine implemented by a premises or central processing server in accordance with the present invention.
Figure 7B:
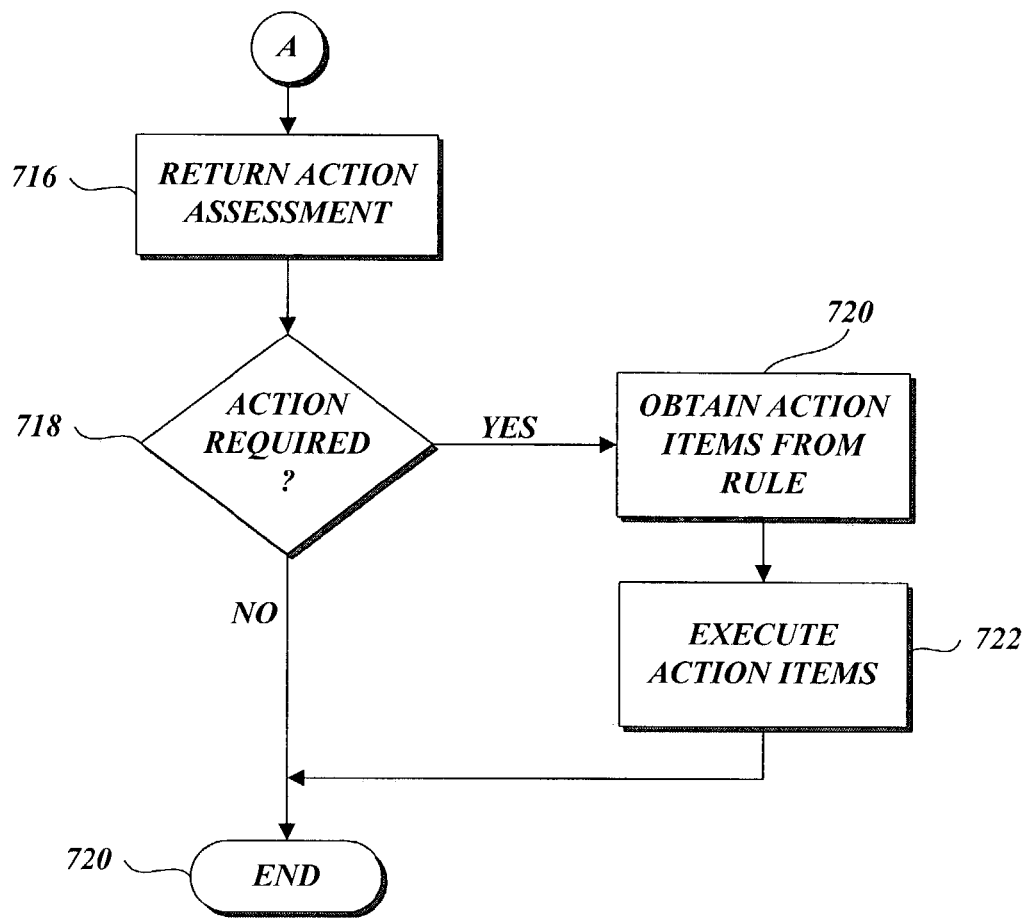

With reference now to FIGS. 7A and 7B, a routine 700 for processing an action assessment implemented by a premises server 204 in accordance with the present invention will be described. Although routine 700 is described in relation to a premises server 204, the routine 700 may be implemented by the central server 304, or other similarly configured computing device. With reference to FIG. 7A, at block 702, monitoring device data is obtained from one or more monitoring devices. In an illustrative embodiment of the present invention, raw monitoring device data may be directly transmitted to the device interface application 514 of the premises server 204. Alternatively, some or all of the monitoring device data may be pre-processed prior to being obtained by the device interface application 514. Additionally, the monitoring device data can also include additional information that facilitates the origin of the monitoring device data (e.g., a device identifier) and any other information describing a parameter associated with the collection of the data (e.g., a time stamp).

At block 704, the data processing application 716 associates one or more identifiers corresponding to the monitoring device data. In an illustrative embodiment of the present invention, the unique identifiers can include any identifiable data that can be used to associate the monitoring device data with an individual or other identifiable device or resource. For example, a unique identifier can include an individual name, a social security number, a traveler identifier, and the like. Additionally, the unique identifier can include a credit account number, such as a bank account number or credit card number, a license number, serial number, and the like. One skilled in the relevant art will appreciate that some monitoring device data can generate multiple unique identifiers. For example, a record indicating the purchase of product/service can generate unique identifiers corresponding to the individual making the purchase, the medium utilized to complete the purchase, and the item purchased.

At decision block 706, a test is conducted to determine whether a record exists in the user profile database 306 for each unique identifier. If no record exits, at block 708, the data processing application 516 generates one or more database records corresponding the unique identifier. Once the database record has been created, or if a record already exists, at block 710, the data processing application 516 populates the record with the corresponding monitoring device data. In an illustrative embodiment of the present invention, the data processing application 516 may include some type of selective processing rules that allow it populate the record with only a portion of the monitoring device data. For example, if the unique identifier relates to a purchase, the data processing application 516 may save only pricing information and the medium of purchase. Additionally, the data processing application 516 may be configured to discard some types of monitoring device data prior to populating a record. For example, the data processing application can establish threshold values for some of the data, such a price bottom for purchases, to mitigate the collection of less relevant data.

At block 712, the data processing application 516 obtains rules corresponding to the modified records and at block 714, generates an action assessment based upon the evaluation of the rule. In one embodiment of the present invention, the data processing application may utilize programmatic rules-based logic to process the monitoring device data. In accordance with this embodiment, the data processing application 516 associates a value for the monitoring device data and generates an action assessment based on the programmatic rule. If more than one piece of information resides in a particular data record, the programmatic rule can include an action assessment based on the evaluation of the combination of data. However, the data processing application 516 may include some type of default status in the event some values of monitoring device data are not accounted for, or if some combination of data is not included.

In an illustrative embodiment of the present invention, each premises 202 may maintain an independent premises rules database 208 that is not dependent on any other premises. Additionally, each individual premises 202 may be configured to allow the various premises 202 on the system to share data by synchronizing the database records on a periodic basis. Alternatively, the premises rules database 208 may also be configured to be mirrored to other selected databases on a more immediate basis. Similarly, one or more premises 202 may be configured to allow for the sharing of the premises rules data by the implementation of a distributed database network.

In an alternative embodiment of the present invention, the rules-based logic may also be implemented in a declarative manner to provide more opportunities for system administrators, or other authorized personnel, to customize an action assessment for a particular evaluation of inputs and/or to modify the number of combination of inputs supported by the data processing application 516. In an illustrative embodiment of the present invention, each premises rules database 208 may be populated with a pre-defined set of processing rules. Accordingly, to modify the rules according to preferences set by each premises, the rules could be generated, and therefore modified, according to a declarative user interface. The declarative user interface allows for the modification of the processing rules as the monitoring device data is processed.

In yet another embodiment of the present invention, the data processing application 516 may utilize a neural network, support vector machine, or other learning system, to establish an action assessment based upon values for a given set of inputs. One skilled in the relevant art will appreciate that a learning system includes a randomly selected weighting scale for a given number of inputs. By utilizing a number of training data sets in which an output is known for a given set of inputs, the learning system could be trained to adjust the weight values for the various inputs to generate an appropriate output, or set of outputs. In accordance with this embodiment, the data processing application would utilize the learning system to generate an output based on values for any number of data inputs and combination of the inputs. Moreover, the premises rules database 208 could include different weighing schema that would allow for modification of the learning system outputs for different factual scenarios. Likewise, in one embodiment, each premises would have the capability to modify the weights for each input, to customize the processing of the data.

In an alternative embodiment to block 714, the monitoring device data may not be automatically processed as it is received. Instead, the data processing application 516 may delay the processing of data for a given time period to allow the collection of multiple information pieces and reduce redundant data processing. Additionally, the data processing application 516 may pre-process the monitoring device data prior to applying a processing rule. For example, the data processing application may utilize finite automata to search for specific types of data to process. The data processing application 516 may program a finite automata to search for a particular individual or to search for specific credit card numbers. Alternatively, the data processing application 516 may filter monitoring device data according to its source to prioritize processing from different sources. Accordingly, routine 700 can be modified to incorporate the different embodiments.

Turning now to FIG. 7B, at block 716, the data processing application can return the action assessment. In an illustrative embodiment of the present invention, the output interface application 518 can generate log files of the action assessment and/or transmit the results of the processing to any number of authorized recipients. At decision block 718, a test is conducted to determine whether additional action items are required. If additional action items are required, at block 720, the data processing application 516 obtains the action items from the premises rules database 208. At block 722, the action items are initiated. In an illustrative embodiment of the present invention, the data processing application may obtain control information from the device profiles database 210 and utilize the output interface application 518 to generate the corresponding protocols to the output devices 214. Additionally, or alternatively, the output interface application 518 may transmit a request to another layer of processing, such as central processing server 304 (FIG. 3) to request that additional data processing take place. Upon the execution of the action items, or if no action items exist, the routine 700 terminates at block 724.

The systems and routines of the present invention may be incorporated in a number of monitoring environments. In one aspect, the present invention may be configured as an airport security assessment system to monitor airline security risks. In this embodiment, monitoring device data may be obtained from reservation systems, travel agencies, check-in system, airport gates, and the like to assess passenger safety security assessments. For example, the assessment system would capable of processing a method of payment, destination, number of bags checked and the FBI criminal database in generating a security assessment. Additionally, the assessment system would also be operable to obtain monitoring device data, such as video data or cockpit access data, from individual airplanes prior to and during a flight as part of the assessment routine.

In another aspect, the present invention may be configured in a commercial sales environment to monitor various aspects of consumer sales. In one embodiment, an action assessment system may be configured to prevent future shoplifting offenses or fraud at a POS terminal. In this embodiment, monitoring device data may be obtained from the POS terminals, various inventory items, digital cameras, facial recognition systems, and the like. In another embodiment, an action assessment system may be configured to reward consumer spending. In this embodiment, monitoring device data may be obtained from the POS terminals, third-party credit companies and biometric data.

In yet another aspect, the present invention may be configured in a military threat assessment environment. In accordance with this aspect, monitoring device data is obtained from a number of sources including physical monitoring devices and intelligence monitoring devices. For example, physical monitoring device data can include digital image cameras, radar images, sonar images, satellite images, and the like, that indicates the likelihood of a monitored activity. The intelligence monitoring device data can include threat assessments, warnings, press announcements, etc. that provide an indication of the likelihood of an activity being a threatening activity. In accordance with the present invention, the central processing server 302 is configured to provide an assessment of a threat to a premises, or other identifiable target, and initiate an action corresponding to the threat. The initiation of an action can include a notification to military officials of the threat category and a notification to authorized users to initiate an action. The notification to authorized users can also include a selection of one or more authorized users best suited to respond to the type of threat that has been assessed. The initiation of an action can also include the initiation additional monitoring actions such as increased video monitoring, the activation of special monitoring devices, and/or the sounding of alarms, etc.

While various embodiments of the invention have been illustrated and described, it will be appreciated that various changes can be made therein without departing from the spirit and scope of the invention.

The embodiments of the invention in which an exclusive property or privilege is claimed are defined as follows:

1. A system for processing monitoring device data, the system comprising:
   at least one monitoring device configured to obtain monitoring device data corresponding to at least one identifiable target;
   a first processing server configured to obtain the monitoring device data and process the monitoring device data according to at least one processing rule that establishes a relationship between risk factors used in making a threat assessment that quantifies the probability an event will occur; a processing rules data store having processing rules corresponding to one or more targets in a monitored premises and risk factor data that is linked to occurrences of the event; and
   wherein the first processing server is configured to utilize processing rules from the processing rules data store to perform a predictive analysis on the monitoring device data in which one or more risk factors represented in the monitoring device data are used to calculate a probability that the event will occur in generating the threat assessment and to generate a notification to authorized personnel of the potential threat if the probability that the event will occur is higher than a predetermined threshold.

2. The system as recited in claim 1, wherein the processing rules are programmatic rules defined prior to obtaining monitoring device data.

3. The system as recited in claim 1, wherein the processing rules are declarative rules that are received at the processing server from an authorized user during the processing of the monitoring device data.

4. The system as recited in claim 3, wherein the first processing server dynamically processes the declarative rules with the processing of the monitoring device data.

5. The system as recited in claim 1, wherein the monitoring device data corresponds to a set of identifiable targets and wherein the first processing server is further configured to process the monitoring device data for at least a subset of the set of identifiable targets.

6. The system as recited in claim 1, wherein the first processing server is further configured to perform a non-predictive analysis of the monitoring device data and generate a result from the non-predictive analysis.

7. The system as recited in claim 1, wherein the predictive analysis corresponds to a processing of two or more processing rules.

8. The system as recited in claim 1, wherein the first processing server generates a set of monitoring device data corresponding to a collection of monitoring device data for a defined period of time prior to performing the predictive data analysis.

9. The system as recited in claim 8, wherein the first processing server pre-processes the set of monitoring device data.

10. The system as recited in claim 9, wherein pre-processing the monitoring device data includes selecting a subset of monitoring device data for processing.

11. The system as recited in claim 1, wherein the first processing server is further configured to obtain monitoring device data from a remote computing device and not directly from the monitoring devices.

12. The system as recited in claim 11, wherein the monitoring device data is collected for a predetermined period of time before the predictive data analysis is performed.

13. The system as recited in claim 12, wherein the first processing server pre-processes the set of monitoring device data.

14. The system as recited in claim 13, wherein pre-processing the monitoring device data includes selecting a subset of monitoring device data for processing.

15. The system as recited in claim 1, wherein the first processing server is configured to send the monitoring device data over a network and receive a result of the predictive analysis according to a processing rule.

16. The system as recited in claim 15, further comprising a second processing rules data store corresponding to the second processing server and operable to provide processing rules to the second processing server.

17. The system as recited in claim 15, wherein the second processing server is operable to perform a predictive data analysis of the result of the predictive analysis from the first processing server.

18. The system as recited in claim 15, wherein the second processing server is operable to obtain a set of processing results from the first processing server and process the entire set of processing results.

19. The system as recite in claim 15, further comprising a third processing server operable to obtain the result from the second processing server and process the result according to a processing rule.

20. The system as recited in claim 1, wherein the result of the predictive analysis corresponds to the generation of an indicator of a threat condition.

21. The system as recited in claim 1, wherein the result of the predictive analysis corresponds to the generation of an indicator of an action to be initiated.

22. The system as recited in claim 1, wherein the result of the predictive analysis corresponds to the initiation of an output device by the first processing server.

23. The system as recited in claim 1, wherein the first processing server obtains one or more declarative rules from an authorized user and modifies the predictive processing according to the declarative rules.

24. The system of claim 1, wherein the monitoring device data corresponds to commercial sales data.

25. The system of claim 24, wherein the predictive analysis corresponds to a prediction of consumer fraud.

26. The system of claim 24, wherein the predictive analysis corresponds to a prediction of consumer spending.

27. The system of claim 1, wherein the monitoring device data corresponds to data associated with a military object and wherein the predictive analysis corresponds to a threat to the military object.

28. A method for processing device data, comprising:
  obtaining monitoring device data from at least one monitoring device corresponding to at least one identifiable target;
  obtaining at least one processing rule corresponding to the identifiable target from a processing rules data store that establishes a relationship between risk factors used in making a threat assessment that quantifies the probability an event will occur;
  processing the monitoring device data according to the at least one processing rule, wherein processing the monitoring device data includes calculating a probability that an event will occur in generating the threat assessment wherein risk factors identified in the monitoring device data that are linked to the occurrence of the event are used in calculating the probability that the event will occur; and
  generating an output corresponding to the processing of the monitoring device data prior to occurrence of the event wherein generating the output includes notifying authorized personnel if the probability that the event will occur is higher than a predetermined threshold.

29. The method as recited in claim 28, wherein the processing rules are programmatic rules defined prior to obtaining monitoring device data.

30. The method as recited in claim 28, wherein the processing rules are declarative rules defined during the processing of the monitoring device data.

31. The method as recited in claim 30, wherein the declarative rules are dynamically processed with the processing of the monitoring device data.

32. The method as recited in claim 28, wherein the monitoring device data corresponds to a set of identifiable targets and wherein the processing the monitoring device data includes processing the monitoring device data for a subset of the set of identifiable targets.

33. The method as recited in claim 28, wherein processing the monitoring device data includes performing a non-predictive analysis of the monitoring device data.

34. The method as recited in claim 28, wherein processing the monitoring device data includes processing the monitoring device data according to two or more processing rules.

35. The method as recited in claim 28, further comprising pre-processing the monitoring device data.

36. The method as recited in claim 35, wherein pre-processing the monitoring device data includes collecting monitoring device data for a period of time and selecting a subset of the collected monitoring device data for processing.

37. The method as recited in claim 36, wherein selecting a subset of the collected monitoring device data includes filtering the monitoring device data.

38. The method as recited in claim 28, wherein generating an output corresponding to the processing of the monitoring device data includes transmitting a result of the processing over a network to a remote device.

39. The method as recited in claim 28, wherein generating an output corresponding to the processing of the monitoring device data includes generating an indication of a threat condition.

40. The method as recited in claim 28, wherein generating an output corresponding to the processing of the monitoring device data includes generating an indication of an action to be initiated by an external party.

41. The method as recited in claim 28, wherein generating an output corresponding to the processing of the monitoring device data includes initiating an output device to perform an action corresponding to a processing rule.

42. The method as recited in claim 28, further comprising obtaining a set of declarative processing rules from an authorized user, wherein processing the monitoring device data includes processing the monitoring device data according to the declarative processing rules.

43. The method as recited in claim 28, further comprising a computer-readable medium.

44. The method as recited in claim 28, wherein the monitoring device data corresponds to commercial sales data.

45. The method as recited in claim 44, wherein processing the monitoring device data according to at least one processing rule includes processing the data to obtain a prediction of consumer fraud.

46. The method as recited in claim 44, wherein processing the monitoring device data according to at least one processing rule includes generating a prediction of consumer spending.

47. The method as recited in claim 28, wherein the monitoring device data corresponds to data associated with the military object and when processing monitoring device data according to at least one processing rule includes a generated predictive analysis corresponding to a threat to the military object.

48. The method as recited in claim 28, further comprising a computer system having a processor, a memory, and an operating environment.

49. A system for processing monitoring device data, the system comprising:
   at least one information collection computing device configured to obtain monitoring device data from a number of monitoring devices, the monitoring device data corresponding to at least one identifiable target;
   a central processing server in communication with the at least one information collection computing device and operable to receive the monitoring device data corresponding to at least one identifiable target; and
   a processing rules data store having processing rules corresponding to one or more identifiable targets and risk factor data that is linked to the occurrence of the event;
   wherein the central processing server is configured to obtain a processing rule corresponding to the at least one target, perform a predictive analysis in which one or more risk factors in the monitoring device data are used to calculate a probability that the event will occur in generating a threat assessment, and generate a notification to authorized personnel of the potential threat if the probability that the event will occur is higher than a predetermined threshold.

50. The system as recited in claim 49, wherein the processing rules are programmatic rules defined prior to obtaining monitoring device data.

51. The system as recited in claim 49, wherein the processing rules are declarative rules defined by an authorized user during the processing of the monitoring device data.

52. The system as recited in claim 51, wherein the central processing server dynamically processes the declarative rules with the processing of the monitoring device data.

53. The system as recited in claim 49, wherein the monitoring device data corresponds to a set of identifiable targets and wherein the central processing server processes the monitoring device data for at least a subset of the set of identifiable targets.

54. The system as recited in claim 49, wherein the central processing server further performs a non-predictive analysis of the monitoring device data and generates a result from the non-predictive analysis.

55. The system as recited in claim 49, wherein the predictive analysis corresponds to a processing of two or more processing rules.

56. The system as recited in claim 49, wherein the information collection information devices generates a set of monitoring device data corresponding to a collection of monitoring device data for a defined period of time prior to transmitting the set of monitoring device data to the central processing server.

57. The system as recited in claim 56, wherein the information collection server pre-processes the set of monitoring device data.

58. The system as recited in claim 57, wherein pre-processing the monitoring device data includes selecting a subset of monitoring device data for processing.

59. The system as recited in claim 49, wherein the central processing server pre-processes the monitoring device data prior to processing the monitoring device data according to a processing rule.

60. The system as recited in claim 59, wherein pre-processing the monitoring device data includes selecting a subset of monitoring device data for processing.

61. The system as recited in claim 49, further comprising a second processing server operable to obtain the result of the predictive analysis from the central processing server and process the result according to a processing rule.

62. The system as recited in claim 61, further comprising a second processing rules data store corresponding to the second processing server and operable to provide processing rules to the second processing server.

63. The system as recited in claim 61, wherein the second processing server is operable to perform a predictive data analysis of the result of the predictive analysis from the central processing server.

64. The system as recited in claim 61, wherein the second processing server is operable to obtain a set of processing results from the central processing server and process the entire set of processing results.

65. The system as recite in claim 61, further comprising a third processing server operable to obtain the result from the second processing server and process the result according to a processing rule.

66. The system as recited in claim 49, wherein the result of the predictive analysis corresponds to the generation of an indicator of a threat condition.

67. The system as recited in claim 49, wherein the result of the predictive analysis corresponds to the generation of an indicator of an action to be initiated.

68. The system as recited in claim 49, wherein the result of the predictive analysis corresponds to the initiation of an output device by the first processing system.

69. The system as recited in claim 49, wherein the first processing system obtains one or more declarative rules from an authorized user and modifies the predictive processing according to the declarative rules.

70. The system of claim 49, wherein the monitoring device data corresponds to commercial sales data.

71. The system of claim 70, wherein the predictive analysis corresponds to a prediction of consumer fraud.

72. The system of claim 70, wherein the predictive analysis corresponds to a prediction of consumer spending.

73. The system of claim 49, wherein the monitoring device data corresponds to data associated with a military object and wherein the predictive analysis corresponds to a threat to the military object.

* * * * *

UNITED STATES PATENT AND TRADEMARK OFFICE
CERTIFICATE OF CORRECTION

PATENT NO.         : 7,480,715 B1                                     Page 1 of 1
APPLICATION NO. : 10/351979
DATED              : January 20, 2009
INVENTOR(S)        : G. T. Barker et al.

It is certified that error appears in the above-identified patent and that said Letters Patent is hereby corrected as shown below:

| COLUMN | LINE | ERROR |
|---|---|---|
| 15 | 58 | "recite" should read --recited-- |
| 18 | 58 | "recite" should read --recited-- |

Signed and Sealed this

Fourteenth Day of July, 2009

JOHN DOLL
*Acting Director of the United States Patent and Trademark Office*